United States Patent [19]

Takahashi

[11] 4,346,972
[45] Aug. 31, 1982

[54] CAMERA EQUIPPED WITH AN AUTOMATICALLY CONTROLLING DEVICE FOR FOCUSING AND SHUTTER OPERATION

[75] Inventor: Tamotsu Takahashi, Shiki, Japan

[73] Assignee: Copal Company Limited, Tokyo, Japan

[21] Appl. No.: 222,873

[22] Filed: Jan. 6, 1981

[30] Foreign Application Priority Data

Jan. 7, 1980 [JP] Japan ................... 55/457

[51] Int. Cl.$^3$ ............................................. G03B 3/10
[52] U.S. Cl. ..................... 354/195; 354/25; 354/60 R; 354/234
[58] Field of Search ............... 354/25, 195, 50, 51, 354/234, 235, 60 R

[56] References Cited

U.S. PATENT DOCUMENTS 4,209,242  6/1980  Kitai et al. ........................... 354/25

Primary Examiner—Michael L. Gellner
Attorney, Agent, or Firm—Cushman, Darby & Cushman

[57] ABSTRACT

A camera equipped with an automatic controlling device for both focusing and the shutter operation comprising a focus detection controlling circuit, an exposure controlling circuit, a single electromagnet controllable by these two circuits and a mechanical or electrical means for operating the two circuits in a predetermined order so as to positively and stably perform a predetermined operation and to make it possible to compactly and cheaply manufacture the camera.

7 Claims, 5 Drawing Figures

CAMERA EQUIPPED WITH AN AUTOMATICALLY CONTROLLING DEVICE FOR FOCUSING AND SHUTTER OPERATION

BACKGROUND OF THE INVENTION (a) Field of the Invention

The present invention relates to a camera equipped with an automatic controlling device made to control both focusing and the shutter operation with a single electromagnetic operating device.

(b) Description of the Prior Art

The auto-focus camera has been recently practiced and the electromagnetic release camera and electric shutter automatically releasing the shutter and controlling the exposure have been already practiced. However, any of them is to have the operation controlled by an electromagnetic operating device.

The above mentioned auto-focus camera mostly uses an electric shutter. In such a case, respective electromagnetic operating devices for focusing and exposure control are provided and are delayed in the operating time so that, when one is performing a controlling operation, the other will be idle and thus there have been many wastes in the formation.

According to the above mentioned conventional auto-focus camera, as the duplicative electromagnetic operating devices are arranged in separated positions, the auto-focus operating mechanism and shutter mechanism will operate in the separated positions within the camera body but, as the mechanisms of both must cooperate with each other in the operation, there has been a problem in that the design and assembly is very complicated.

SUMMARY OF THE INVENTION

An object of the present invention is to provide a camera equipped with this kind of automatic controlling device wherein the focusing and shutter operation are controlled with a single electromagnetic operating device and a simple and reasonable formation and operation are obtained.

According to the present invention, this object is attained by controlling the operation of a single electromagnet with a focus detection controlling circuit and exposure controlling circuit and operating these two circuits in a predetermined order and timing with either of a mechanical means and electrical means.

According to this formation of the present invention, there are advantages that not only the entire device is simplified in the formation and can be contained in a comparatively small space but also a positive and stable operation is obtained. Therefore, a camera having an automatic focusing function and antomatic exposing function can be provided at a low cost.

According to another formation of the present invention, as the focusing and shutter operation can be controlled with electric pulses, not only will the operational delay of the mechanical device from the circuit operation be easy to compensate but also the soft release, remote control and sequence control functions of the camera will be very easy to make.

DETAILED DESCRIPTION OF THE PREFERRED EMBODIMENTS

Figure 1:
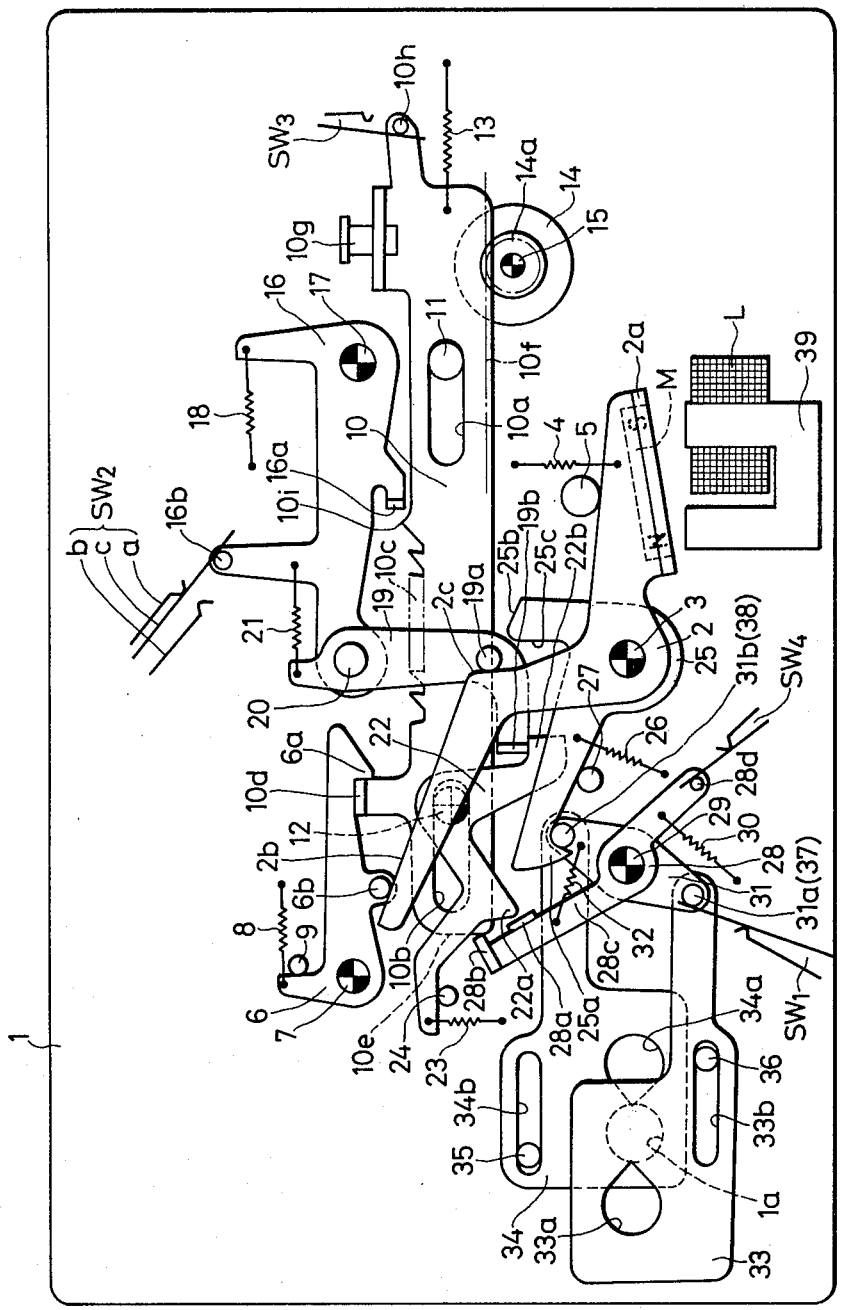
FIG. 1 is an elevational view showing an embodiment of a mechanical part of a device according to the present invention.
Figure 2:
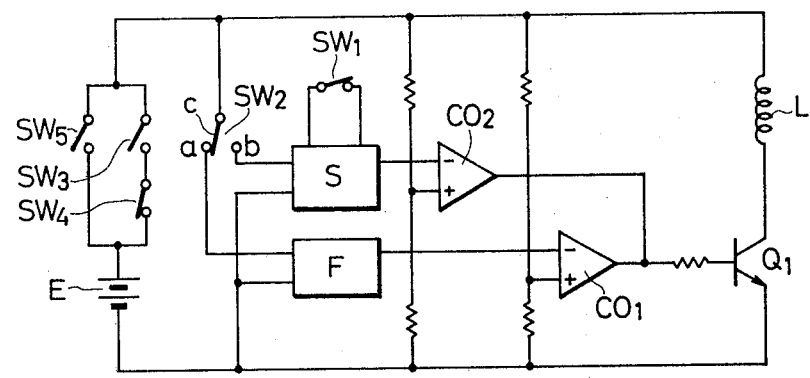
FIG. 2 is a wiring diagram showing an embodiment of an electric circuit part of a device according to the present invention to be used together with the device shown in FIG. 1.

In FIGS. 1 and 2, reference numeral 1 denotes a base plate which has an exposure aperture 1a and to which the below described members are attached; 2 denotes an armature lever pivoted on the base plate 1 by a shaft 3, biased counterclockwise by a spring 4, restricted by a stopper pin 5 from being biased counterclockwise and having an armature 2a and arm parts 2b and 2c. Reference numeral 6 denotes a starting lever pivoted on the base plate 1 by a shaft 7, biased clockwise by a spring 8, restrict by a stopper pin 9 from being biased clockwise and having a hook 6a and a pin 6b engaging with the arm part 2b. Reference numeral 10 denotes a cocking plate having slots 10a and 10b pin-slot-connected respectively with a pin 11 and shaft 12 erected on the base plate 1, a serrated rack part 10c, a bend 10d engageable with the hook part 6a, an end part 10e, a rack part 10f, a focusing pin 10g operatively connected as engaged with such focusing mechanism as a helicoidal not illustrated, a switch pin 10h made of an insulating material and a cocking cam 10i and biased rightward by a spring 13. Reference numeral 14 denotes a flywheel pivoted on the base plate 1 by a shaft 15 and formed integrally with a pinion 14a meshing with the rack part 10f. Reference numeral 16 denotes a locking lever pivoted on the base plate 1 by a shaft 17, biased counterclockwise by a spring 18 and having a bend 16 engageable with the rack part 10c and an insulating pin 16b. Reference numeral 19 denotes a release clutch lever pivoted on the locking lever 16 by a shaft 20, biased clockwise by a spring 21 and having a clutch pin 19a engaging with the arm 2c of the armature lever 2 and a bend 19b. Reference numeral 22 denotes a closing release lever pivoted on the base plate 1 by the shaft 12, biased counterclockwise by a spring 23, restricted by a stopper pin 24 from being biased counterclockwise and having an arm part 22a and an arm 22b engaging with the bend 19b. Reference numeral 25 denotes an opening release lever pivoted on the base plate 1 by the shaft 3, having a hook 25a, an end part 25b engageable with the clutch pin 19a and a side part 25c, biased counterclockwise by a spring 26, restricted by a stopper pin 27 from being biased counterclockwise. Reference numeral 28 denotes a closing driving lever pivoted on the base plate 1 by a shaft 29, biased clockwise by a spring 30 and having a bend 28a engaging with the arm part 22a of the closing release lever 22, a bend 28b engaging with the end part 10e of the cocking plate 10, an arm 28c and a switch pin 28d made of an insulating material. Reference numeral 31 denotes an opening driving lever pivoted on the base plate 1 by a shaft 29, biased counterclockwise by a spring 32 stretched between it and the closing driving lever 28 and having an insulating switch pin 31a and a pin 31b engageable with the arm 28c and hook 25a. Reference numerals 33 and 34 denote respectively shutter blades having openings 33a and 34a and slots 33b and 34b, pin-slot-connected through pins 35 and 36 erected on the base plate 1 and pivoted by shafts 37 and 38 coaxial with the switch pin 31a and pin 31b of the opening driving lever 31 and projecting in the directions opposed to said pins. Reference numeral 39 denotes an electromagnet provided with a coil L. Reference symbol $SW_1$ denotes a starting switch engaged with the switching pin 31a and for starting the controlling operation of the exposure controlling circuit S; $SW_2$ denotes a change-over switch consisting of fixed contacts a and b and a movable contact piece c which engages with the pin 16b of the locking lever 16 to connect either of the focus detection controlling circuit F and exposure controlling circuit S to the electromagnet 39; $SW_3$ denotes a closing switch engaging with the switch pin 10h of the cocking plate 10; $SW_4$ denotes an opening switch engaging with the switch pin 28d of the closing driving lever 28. In FIG. 2, $SW_5$ denotes a normally opened main switch, E denotes an electric current source, $CO_1$ and $CO_2$ denote comparators, and $Q_1$ denotes a transistor.

By the way, when the electric current source E is connected, the outputs of the focus detection controlling circuit F and exposure controlling circuit S will be placed on the "L" level and will be turned to be on the "H" level after a predetermined operation.

The operation shall be explained in the following.

A camera ready for photographing is shown in FIG. 1. In this state, when the main switch $SW_5$ shown in FIG. 2 is closed, the focus detection controlling circuit F will be started through the change-over switch $SW_2$. That is to say, when the switch $SW_5$ is closed, the output of the focus detection controlling circuit F will be placed on the "L" level, the output of the comparator $CO_1$ will be on the "H" level, therefore the transistor $Q_1$ will conduct, an electric current will flow through the coil L and the electromagnet 39 will be energized. Therefore, the armature lever 2 will be biased clockwise against the spring 4 and will be held in the position. By the above mentioned clockwise biasing of the armature lever 2, the pin 6b will be pushed by the arm 2b to rotate the starting lever 6 counterclockwise and to disengage the hook 6a with the bend 10d. On the other hand, the pin 19a will be pushed by the arm 2c to rotate the release clutch lever 19 counterclockwise, to move the pin 19a onto the end part 25b of the release lever 25 and to disengage the bend 19b with the arm 22b of the closing release lever 22. At this time, the pin 19a will mount on the end part 25b and therefore the release clutch lever 19 will be prevented from lowering. The cocking plate 10 unlocked by the starting lever 6 will be moved rightward by the spring 13 while being braked by the flywheel 14 and, in the course, first, the closing switch $SW_3$ will be closed and such focusing mechanism as a helicoidal not illustrated, will be operated by the focusing pin 10g. When the object to be photographed is focused by the operation of the focusing mechanism, by the operation of the focus detection controlling circuit F detecting it, its output will be turned to be on the "H" level, the output of the comparator $CO_1$ will be turned to be on the "L" level, therefore the transistor $Q_1$ will be cut off, the current to the coil L will be interrupted and the electromagnet 39 will be de-energized. Therefore, the armature lever 2 will be rotated counterclockwise by the spring 4 and will be stopped by the stopper pin 5. In the above described operating process, in case the electromagnet 39 is either energized or de-energized, the locking lever 16 will be prevented by the release clutch lever 19 from rotating counterclockwise but, in case the electromagnet 39 is de-energized, the clutch pin 19a will lower a little until it is mounted on the end part 25b and, therefore, as a result, the locking lever 16 will be slightly counterclockwise rotated. However, by the counterclockwise rotation, the bend 16a will not be contacted with the cocking plate 10 and the change-over switch $SW_2$ will not be operated.

When the electromagnet 39 is de-energized and the armature lever 2 is rotated counterclockwise as described above, the clutch pin 19a will follow the arm 2c and the release clutch lever 19 will be rotated clockwise by the spring 21. In such a case, as mentioned above, the release clutch lever 19 will be in a position slightly lower than the position shown in FIG. 1, therefore, the bend 19b will engage with the end surface of the arm 22b and its clockwise rotation will be prevented but, at this time, the clutch pin 19a will disengage with the end part 25b and will fall down between the arm part 2c and side part 25c and, as a result, the locking lever 16 will rotate counterclockwise. By the above mentioned counterclockwise rotation of the locking lever 16, the bend 16a will be meshed with the rack part 10c and the rightward movement of the cocking lever 10 will be stopped. Therefore, the operation of the focusing mechanism will be stopped, the photographing lens will be fixed with the predetermined object focused, the movable contact piece c will be operated by the switch pin 16b so as to contact the fixed contact b, the focus detection controlling circuit F will be cut off from the current source E and instead the exposure controlling circuit S will be connected to the current source E. The output of the exposure controlling circuit S connected to the current source E will be placed on the "L" level, the output of the comparator $CO_2$ will be on the "H" level, the transistor $Q_1$ will again conduct, the current will flow through the coil L and the electromagnet 39 will be again energized to attract the armature 2a and clockwise rotate the armature lever 2. At this time, as the clutch pin 19a is inserted between the arm 2c and side part 25c as mentioned above, the opening release lever 25 will clockwise rotate simultaneously with the armature lever 2 through the clutch pin 19a to disengage the hook 25a with the pin 31b. Therefore, the opening driving lever 31 will be rotated counterclockwise by the spring 32 to open the starting switch $SW_1$ with its initial motion, to start the controlling operation of the exposure controlling circuit S, to operate the shutter blades 33 and 34 and to open the exposure aperture 1a with the openings 33a and 34a. Further, the pin 31b will move toward the arm 28c of the closing driving lever 28. When a proper exposure time determined by the exposure controlling circuit S has elapsed, the output of said circuit S will turn to be on the "H" level, the output of the comparator $CO_2$ will turn to be on the "L" level, the transistor $Q_1$ will be cut off, the current to the coil L will be interrupted, the electromagnet 39 will be again de-energized and the armature lever 2 will rotate counterclockwise. In such case, the release clutch lever 19 will tend to rotate clockwise due to the spring 21 but, as the bend 19b engages with the end surface of the arm 22b and the counterclockwise rotating force of the closing release lever 22 is stronger than the clockwise rotating force of the lever 19, it will not be able to rotate clockwise. However, in fact, as the clutch pin 19a engages with the side part 25c, the counterclockwise rotating force of the opening release lever 25 by the spring 26 will be added to the lever 19 and, in the operation until the opening release lever 25 is stopped by the stopper pin 27, the bend 19b will push the arm 22b to rotate the closing release lever 22 clockwise and to disengage the arm 22a with the bend 28a. Therefore, the closing driving lever 28 will be rotated clockwise by the spring 30. In such case, the switch SW4 will be opened, the pin 31b will be integrally rotated clockwise by the arm 28 to return the shutter blades 33 and 34 to the initial positions, to close the exposure aperture 1a from the opening course or fully opened state, to engage the pin 31b with the hook 25a and to close the starting switch SW1 with the pin 31a.

The cocking operation to bring the photographing completed state, wherein all the operations are complated as in the above, to the photographing ready state shown in FIG. 1 and the operations of the respective elements associated with it shall be explained in the following.

The cocking operation is made by moving the cocking plate 10 kept on the right to the left against the spring 13 and engaging the bend 10d with the hook 6a. When the photographing ends, the cocking plate 10 will move rightward in response to the distance from the camera to the photographed object at the time of photographing and will stop. Therefore, the position in which the cocking plate 10 stops will not be fixed but the bend 16a will mesh with some part of the rack part 10c. When the cocking lever 10 is moved leftward from that position, the end part 10e will engage with the bend 28b and will push it to rotate the driving lever 28 counterclockwise. As the bend 16a of the locking lever 16 is meshed with the rack part 10c, since the rack part 10c is serrated the locking lever 16 will be pushed up by the slope of the rack to rotate slightly clockwise and to pull up the release clutch lever 19. However at this time, the bend 19b of the release locking lever 19 will engage with the end surface of the arm 22b of the closing release lever 22, the pin 19a will still engage with the side part 25c and therefore the closing release lever 22 will be in a clockwise rotated position. When the cocking cam 10i comes to engage with the bend 16a of the cocking lever 16 with the leftward movement of the cocking plate 10, the bend 16a will be pushed up by the cocking cam 10i, the locking lever 16 will further rotate clockwise and will lift the release clutch lever 19, therefore the pin 19a will first disengage with the side part 25c, the closing release lever 22 will rotate counterclockwise while pushing the bend 19b with the tip surface of its arm 22b and will be stopped by the stopper pin 24. Thereby, the arm 22a will be moved to a position in which the bend 28a can be stopped. The release clutch lever 19 will be further elevated, the bend 19b will be disengaged with the tip surface of the arm 22b, therefore the lever 19 will be rotated clockwise by the spring 21 and the clutch pin 19a will come to engage with the arm part 2c. Thus, when the cocking cam 10i passes the position of the bend 16a, the bend 19b will engage with the arm 22b and therefore the locking lever 16 will stop where the bend 16a is somewhat away from the tip of the rack part 10c. After such operations of the respective members as in the above are made, the cocking plate 10 will open the switch SW3, will then close the opening switch SW4 through the closing driving lever 28 and will lead the bend 28a to engage with the arm 22a and finally the bend 10d will engage with the hook 6a of the starting lever 6 to complete the cocking stroke.

In the above explained embodiment of the present invention, the armature 2a of the armature lever 2 is formed of such ferromagnetic material as iron. The circuit diagram shown in FIG. 2 is based on using the armature 2a formed of such ferromagnetic material. However, such permanent magnet M as is shown by the broken line in FIG. 1 may be used instead of this armature 2a. In case the permanent magnet M is thus used, each controlling circuit may issue a pulse signal in each of four operations of the movable piece shown as the armature lever 2, that is, attracting operations and separating operations for focusing and shutter control and, therefore, the consumption of the current source will be able to be reduced.

Figure 3:
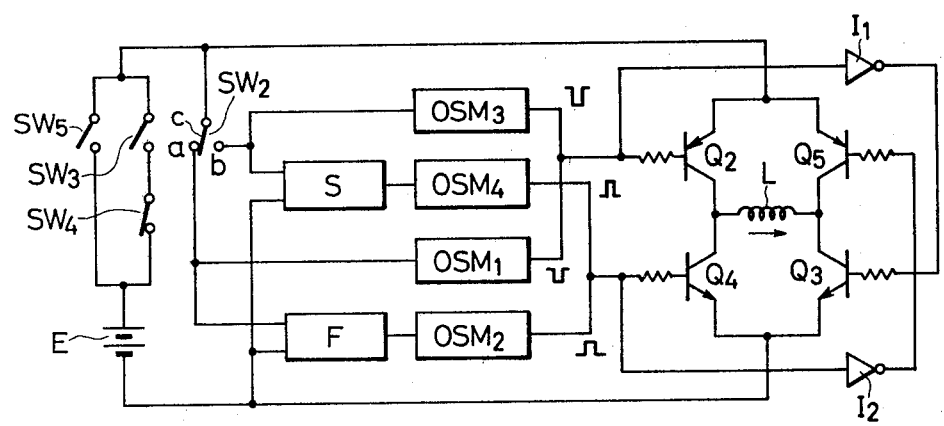
FIGS. 3 to 5 are wiring diagrams showing other embodiments of electric circuit parts different from one another.

The circuit for controlling the electromagnet with the above mentioned pulse signals shall be explained in the following with reference to FIG. 3. By the way, the operating mechanism is exactly the same as is shown in FIG. 1 in the shapes and operation of the respective members except only that the permanent magnet M is used instead of the armature 2a in FIG. 1 and therefore FIG. 1 shall be used. In FIG. 3, symbols $OSM_1$ to $OSM_4$ denote one-shot multi-vibrator circuits (which shall be abbraviated respectively as $OSM_1$ to $OSM_4$ hereinafter), $Q_2$ to $Q_5$ denote transistors and $I_1$ and $I_2$ denote inverter circuits. By the way, the exposure controlling circuit S is to start an exposure controlling operation when the starting switch SW1 is opened in the circuit in FIG. 2 but is to start the operation when it is connected to the current source E in the present circuit. Therefore, the starting switch SW1 and switch pin 31a in FIG. 1 are not necessary.

The operation of the circuit shown in FIG. 3 shall be explained as follows.

When the main switch SW5 is closed, the focus detection controlling circuit F will start the operation, the output of $OSM_1$ will turn to be on the "L" level for a predetermined time, the transistor $Q_2$ and the transistor $Q_3$ through the inverter circuit $I_1$ will conduct, an electric current in the direction indicated by the arrow will be made to flow through the coil L, a magnetic field in the direction of attracting the permanent magnet M will be generated in the electromagnet 39 and the armature lever 2 will be rotated clockwise. The current through the coil L will be interrupted after a predetermined time but its attraction will be retained by the magnetic force of only the permanent magnet M. Thereafter, when the output of $OSM_2$ is turned to "H" level for a predetermined time by the operation of the focus detection controlling circuit F, the transistor $Q_4$ and the transistor $Q_5$ through the inverter circuit $I_2$ will conduct, a current against the direction indicated by the arrow will flow through the coil L, therefore the magnetic field of the electromagnet 39 will act to cancel the magnetic force of the permanent magnet M and the armature lever 2 will rotate counterclockwise. Further, as the movable contact piece c of the change-over switch SW2 is switched from the fixed contacts a to b as operatively connected with the counterclockwise rotation of the armature lever 2, when the exposure controlling circuit S begins to operate, the output of $OSM_3$ will turn to be on the "L" level for a predetermined time, the current in the direction indicated by the arrow will flow through the coil L the same as is described above and the electromagnet 39 will be energized for the third time to again attract the permanent magnet M and to rotate the armature lever 2 clockwise. After a predetermined time, when the exposure controlling circuit S operates and the output of $OSM_4$ turns to be on the "H" level for a predetermined time, the same as is described above, the current against the direction indicated by the arrow will flow through the coil L, the electromagnet 39 will be energized for the fourth time to cancel the magnetic force of the permanent magnet M and to again rotate the armature lever 2 counterclockwise.

Figure 4:
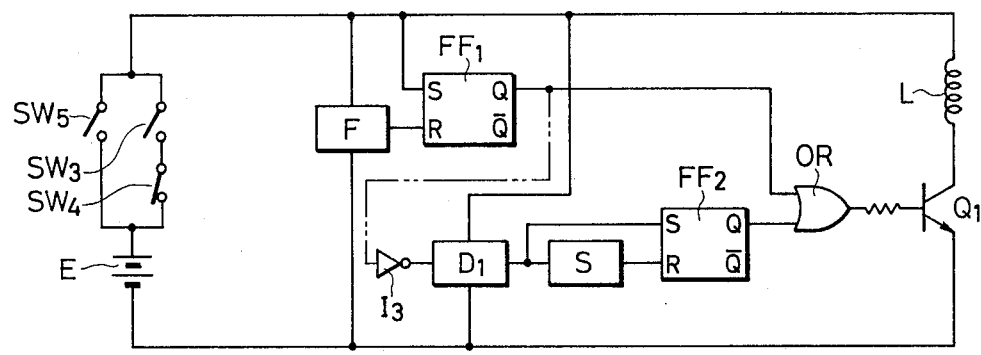

In each of the above embodiments, the focus detection controlling operation and exposure controlling operation are made in series but, in the circuit of FIG. 4, they are modified to be able to be made in parrallel. Therefore, in this case, the change-over switch SW$_2$ and switch pin 16b are not necessary. This shall be explained in the following. Symbol D$_1$ denotes a delay circuit having a delay time anticipating the longest time required for the focus detecting operation of the mechanical mechanism part, FF$_1$ and FF$_2$ denote flip-flop circuits (which shall be abbreviated respectively as FF$_1$ and FF$_2$) and OR denotes an OR-gate circuit. In the case of this circuit, when the main switch SW$_5$ is closed, FF$_1$ will be set, the output Q will be on the "H" level and the focus detection controlling circuit F and delay circuit D$_1$ will begin to operate. When the output of the OR-gate circuit OR is on the "H" level, the transistor Q$_1$ will conduct and, the same as in the case of FIG. 2, the electromagnet 39 will be energized for the first time. When FF$_1$ is reset by the operation of the focus detection controlling circuit F, its output Q will turn to be on the "L" level and the electromagnet 39 will be de-energized. Further, after the longest time of the focus detecting operation of the delay circuit D$_1$, its output will turn to be on the "H" level, FF$_2$ will be set and the exposure controlling circuit S will begin to operate. The output Q of the set FF$_2$ will be on the "H" level and therefore the electromagnet 39 will be energized for the second time. When FF$_2$ is reset by the operation after the lapse of a proper exposure time determined by the exposure controlling circuit S, its output Q will turn to be on the "L" level and the electromagnet 39 will be again de-energized. By the way, when the delay circuit D$_1$ is started through the inverter circuit I$_3$ as shown by the two-point chain line with the signal when the output of FF$_1$ turns from the "H" level to be on the "L" level, the focus detecting operation and exposure controlling operation will be able to be made in series without using a mechanical switch. In such a case, the delay time of the delay circuit D$_1$ is set to be able to provide the time required for the focus detection controlling operation, that is, the time required until the armature lever 2 rotates perfectly counterclockwise.

Figure 5:
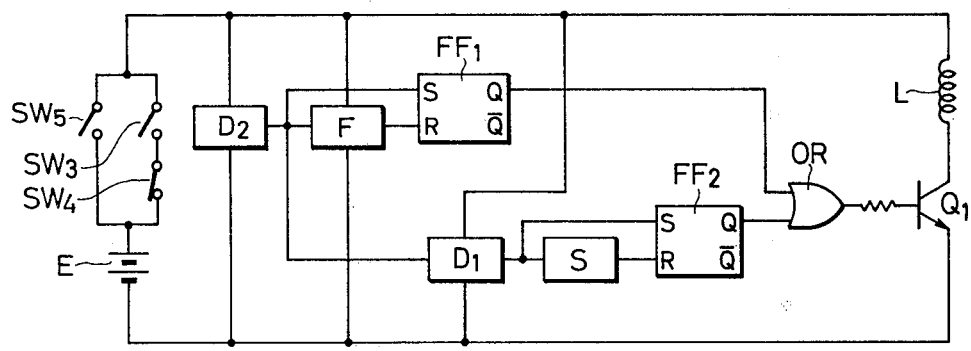

FIG. 5 shows a case wherein the delay circuit D$_2$ is connected to the circuit of FIG. 4 to make the self-timer photographing possible. In the delay circuit D$_2$, though not illustrated, a delay time in seconds, for example, 10 seconds for the self-timer operation and a very short time in seconds when the self-timer is not used can be selected. FF$_1$ is set by the signal after such delay operation so as to operate the focus detection controlling circuit F and delay circuit D$_1$.

By the way, each of the circuits of FIGS. 4 and 5 can be easily modified to a circuit in which the electromagnet 39 is pulse-driven as in FIG. 3. That is to say, in those circuits, OSM circuits may be connected to the outputs Q and $\overline{Q}$ of FF$_1$ and FF$_2$ so as to generate predetermined magnetic fields in the coils L in response to the pulses.

I claim:
1. A camera having a shutter, comprising:
    an electromagnetic operating device including therein a single electromagnet capable of taking a first state and a second state;
    a focusing mechanism connected to said electromagnetic operating device and capable of being held normally at its start position;
    a focus detection controlling circuit capable of being connected to said electromagnet and capable of changing the state of said electromagnet from said first state to said second state in association with a shutter releasing operation to release said focusing mechanism through said electromagnetic operating device to start the focusing operation and capable of changing again the state of said electromagnet from said second state to said first state to stop the focusing operation of said focusing mechanism through said electromagnetic operating device when focused;
    a switching means connected to said focus detection controlling circuit and capable of connecting normally said focus detection controlling circuit to said electromagnet and capable of being switched over when focused;
    shutter opening and closing operating mechanisms capable of being operated by said electromagnetic operating device;
    an exposure controlling circuit capable of being connected to said electromagnet and capable of changing the state of said electromagnet from said first state to said second state to make said shutter opening operating mechanism operate through said electromagnetic operating device to open said shutter when the focusing operation has ended and when said exposure controlling circuit is connected to said electromagnet by switching-over of said switching means and capable of changing the state of said electromagnet from said second state to said first state to make said shutter closing operating mechanism operate through said electromagnetic operating device to close said shutter when a proper exposure time has elapsed; and
    a controlling means capable of operating to transmit the operation of said electromagnetic operating device to said shutter opening and closing operating mechanisms after the focusing operation has ended.

2. A camera according to claim 1 wherein said electromagnetic operating device further includes an armature lever capable of being operated by said electromagnet; said controlling means includes a release clutch lever engaged with said armature lever, a locking lever which pivots said release clutch lever and can take the first and second positions and a switching means which is operatively connected to said locking lever so that, when said locking lever is in said first position, said focus detection controlling circuit can be in an operating state and, when said locking lever is in said second position, said exposure controlling circuit can be in an operating state; said focusing mechanism includes a cocking plate which can be engaged with said locking lever and can take a cocked position and uncocked position and in which, when said locking lever moves from said first position to the second position, the movement from said cocked position to the uncocked position can be stopped by said locking lever and a starting lever which can be engaged with said cocking plate, is engaged with said armature lever and disengages from said cocking plate to release said cocking plate when said armature lever is operated by said electromagnet.

3. A camera according to claim 2 wherein said shutter opening and closing operating mechanisms include an opening release lever engageable with said release clutch lever, an opening driving lever which can be engaged with said opening release lever, can be held in the cocked position by said opening release lever and can be released by said opening release lever by the second operation of said electromagnetic operating device, a closing driving lever which can be engaged with said cocking plate and opening driving lever and can bring said opening driving lever to the cocked position and a closing release lever which can be engaged with said closing driving lever and is disengaged from said closing driving lever when said electromagnetic operating device completes the second operation.

4. A camera according to claim 3 wherein said armature lever has a permanent magnet capable of cooperating with said electromagnet.

5. A camera according to claim 1 wherein said switching means includes a timer circuit.

6. A camera comprising:
an electromagnetic operating device including therein a single electromagnet,
a focus detection controlling circuit capable of being connected to said electromagnet to control the operation of said electromagnetic operating device,
an exposure controlling circuit capable of being connected to said electromagnet to control the operation of said electromagnetic operating device,
a controlling means associated with said electromagnetic operating device and arranged so as to be able to first control the operation of said electromagnetic operating device through said focus detection controlling circuit and to then again control the operation of said electromagnetic operating device through said exposure controlling circuit,
a focusing mechanism operated by the first operation of said electromagnetic operating device, and a shutter opening and closing operating mechanism operated by the second operation of said electromagnetic operating device, and wherein:
said electromagnetic operating device further includes an armature lever capable of being operated by said electromagnet;
said controlling means includes a release clutch lever engaged with said armature lever, a locking lever which pivots said release clutch lever and can take first and second positions and a switching means which is operatively connected to said locking lever so that, when said locking lever is in said first position, said focus detection controlling circuit can be in an operating state and, when said locking lever is in said second position, said exposure controlling circuit can be in an operating state;
said focusing mechanism includes a cocking plate which can be engaged with said locking lever and can take a cocked position and uncocked position and in which, when said locking lever moves from said first position to the second position, the movement from said cocked position to the uncocked position can be stopped by said locking lever, and a starting lever which can be engaged with said cocking plate, is engaged with said armature lever and disengages from said cocking plate to release said cocking plate when said armature lever is operated by said electromagnet; and
said shutter opening and closing operating mechanism includes an opening release lever engageable with said release clutch lever, an opening driving lever which can be engaged with said opening release lever, can be held in the cocked position by said opening release lever and can be released by said opening release lever by the second operation of said electromagnetic operating device, a closing driving lever which can be engaged with said cocking plate and opening driving lever and can bring said opening driving lever to the cocked position, and a closing release lever which can be engaged with said closing driving lever and is disengaged from said closing driving lever when said electromagnetic operating device completes the second operation.

7. A camera according to claim 6 wherein said armature lever has a permanent magnet which can cooperate with said electromagnet.

* * * * *